(12) United States Patent
Chan et al.

(10) Patent No.: US 9,615,603 B2
(45) Date of Patent: Apr. 11, 2017

(54) FOOD-DRYING DEVICE WITH AUTOMATIC GEAR-SHIFT DRIVE MECHANISM, AND RELATED COUPLING DEVICE

(75) Inventors: Chung Ming Chan, Hung Hom (HK); Kwan Kit Chan, Hung Hom (HK)

(73) Assignee: Golden Choice Products Ltd., Kowloon (HK)

( * ) Notice: Subject to any disclaimer, the term of this patent is extended or adjusted under 35 U.S.C. 154(b) by 1395 days.

(21) Appl. No.: 13/448,756

(22) Filed: Apr. 17, 2012

(65) Prior Publication Data

US 2013/0184118 A1    Jul. 18, 2013

(30) Foreign Application Priority Data

Jan. 16, 2012   (HK) .................................. 12100483

(51) Int. Cl.
 *A23N 12/08*   (2006.01)
 *A47J 43/24*   (2006.01)

(52) U.S. Cl.
 CPC ............ *A23N 12/086* (2013.01); *A47J 43/24* (2013.01); *F16H 2200/0034* (2013.01); *F16H 2200/2007* (2013.01); *Y10T 74/19642* (2015.01)

(58) Field of Classification Search
 CPC .. A23N 12/086; A47J 43/24; Y10T 74/19642; F16H 2200/2007; F16H 2200/0034
 See application file for complete search history.

(56) References Cited

U.S. PATENT DOCUMENTS

| 5,620,272 A | * | 4/1997 | Sheng | ................ E05D 11/1007 |
| | | | | 182/163 |
| 2001/0027915 A1 | * | 10/2001 | Narayanan | ............ H01H 71/70 |
| | | | | 200/400 |
| 2007/0006742 A1 | | 1/2007 | Paradise et al. | |
| 2010/0263555 A1 | * | 10/2010 | Mah | ........................ A47J 43/24 |
| | | | | 99/495 |

FOREIGN PATENT DOCUMENTS

| CN | 87204354 | 3/1988 |
| CN | 2036013 | 4/1989 |
| CN | 2059338 | 7/1990 |

(Continued)

OTHER PUBLICATIONS

Written Opinion of the International Searching Authority for International Application No. PCT/CN2012/086955.

(Continued)

*Primary Examiner* — Jianying Atkisson
(74) *Attorney, Agent, or Firm* — Wolf, Greenfield & Sacks, P.C.

(57) ABSTRACT

The current invention provides an automatic gear-shift drive mechanism including a first gear system having a first gear ratio, and a second gear system having a second gear ratio, wherein the first gear ratio is higher than the second gear ratio, and is biased to spin the drying assembly with the first gear system when the automatic gear-shift drive mechanism is driven and the workload is below a threshold workload, and switch to spin the drying assembly with the first and the second gear systems when the automatic gear-shift drive (Continued)

mechanism is driven and the workload is at or above the threshold workload.

16 Claims, 12 Drawing Sheets

(56) References Cited

FOREIGN PATENT DOCUMENTS

| | | |
|---|---|---|
| CN | 101331973 | 12/2008 |
| CN | 201445319 | 5/2010 |
| FR | 2362609 A1 | 3/1978 |
| FR | 2942384 A1 | 8/2010 |
| KR | 20110004870 | 5/2011 |

OTHER PUBLICATIONS

Extended European Search Report for European Patent Application No. 12866342.4-1656, dated Feb. 19, 2016.

\* cited by examiner $$F_{net} = \sum_{i=1}^{n/2} (Rn \sin\theta - \mu Rn \cos\theta)\Big|_i - Fs - mg$$

net upward force acting on the plate

FOOD-DRYING DEVICE WITH AUTOMATIC GEAR-SHIFT DRIVE MECHANISM, AND RELATED COUPLING DEVICE

RELATED APPLICATIONS

This Application claims priority to Hong Kong Patent Application No. 12100483.0 filed Jan. 16, 2012, entitled FOOD-DRYING DEVICE WITH AUTOMATIC GEAR-SHIFT DRIVE MECHANISM, AND RELATED COUPLING DEVICE, which is herein incorporated by reference in its entirety.

FIELD OF THE INVENTION

This invention relates to food-drying device with automatic gear-shift drive mechanism, and the related automatic gear-shift drive mechanism.

BACKGROUND OF THE INVENTION

In many cases, it is desirable to dry washed food, for example to avoid making watery salad. There are many food-drying devices available. Typically, such device has a container, in which a drying assembly having a plurality of bores, for example a basket, is disposed. The drying assembly can be spun relative to the container. A drive mechanism for spinning the drying assembly relative to the container is provided, while the drive mechanism is usually integrated with the cover of the container. The drive mechanism is typically actuated by a handle.

Salad spinners in US2010/0263555A1 provide different handle rotation speeds limited by different gear ratios. Specifically, when the drive mechanism of the spinners in this US publication is driven by the handle rotating in clockwise direction, the handle engages a set of gear system such that rotation speed is amplified by one given gear ratio. When the handle rotates in anti-clockwise direction, the handle engages another set of gear system with which the rotation speed is amplified by a different gear ratio. In principle, however, there is no difference between these devices with any other salad spinners that are basically being driven at one speed amplification by a given gear ratio at one given single operation.

It is desirable to devise an intelligent drive mechanism that can start the motion at a lower speed amplification (hence less effort) at/or above a predetermined threshold load and is then capable to shift to a higher speed amplification automatically to improve the performance of the operation of food-drying devices.

OBJECTS OF THE INVENTION

Therefore, it is an object of this invention to resolve at least one or more of the problems as set forth in the prior art. Particularly, it is an object of the current invention to provide food-drying devices that can provide automatic gear-shift such that proper selected speed amplification to enhance the performance is provided automatically. As a minimum, it is an object of this invention to provide the public with a useful choice.

SUMMARY OF THE INVENTION

Accordingly, this invention provides a food-drying device including:

a container;
a drying assembly having a plurality of bores, said drying assembly disposed in the container and capable of being spun relative to the container; and
an automatic gear-shift drive mechanism for spinning the drying assembly relative to the container The food-drying device carries a workload. Further, the automatic gear-shift drive mechanism includes
1) a first gear system having a first amplification speed, and
2) a second gear system that can couple with the first gear system to form a coupled first and second gear system having a second amplification speed The first amplification speed is higher than the second amplification speed. When the automatic gear-shift drive mechanism is started being driven, the automatic gear-shift drive mechanism is biased to spin the drying assembly with the first gear system when the automatic gear-shift drive mechanism is driven and the workload is below a threshold, and switch to spin the drying assembly with the coupled first and second gear system when the automatic gear-shift drive mechanism is driven and the workload is at or above the threshold.

Preferably, the first gear system and the second gear system are respective first and second planetary gear systems. More preferably, the automatic gear-shift drive mechanism spins the drying assembly through an output shaft that rotates about an output axis; and the first planetary and second planetary gear systems have respective first and second gear rings and first and second planetary gears, and said first and second gear rings rotates about the output axis, while at any time, only one of the first gear ring and the second gear ring is allowed to rotate about the output axis. Even more preferably, when the automatic gear-shift drive mechanism spins the drying assembly with the first planetary gear system, the first planetary gear system drives the output shaft and the output shaft drives the second planetary gear system; and when the automatic gear-shift drive mechanism spins the drying assembly with the coupled first and second planetary gear systems, the first planetary gear system drives the second planetary gear, and second planetary gear drives the output shaft.

Optionally, the automatic gear-shift drive mechanism includes a lever, and when the automatic gear-shift drive mechanism is started being driven and the workload is below the threshold, the lever is biased to cause the first gear ring to stop rotating while allowing the second gear ring to rotate; and when the automatic gear-shift drive mechanism is started being driven and the workload is at or above the threshold, the lever switches to cause the second gear ring to stop rotating while allowing the first gear ring to rotate. More preferably, the automatic gear-shift drive mechanism includes a coupling device that drives the output shaft, and when the automatic gear-shift drive mechanism is started being driven and the workload is below the threshold, said coupling device biases the lever to cause the first gear ring to stop rotating while allowing the second gear ring to rotate; and when the automatic gear-shift drive mechanism is started being driven and the workload is at or above the threshold, the coupling device actuates the lever to cause the second gear ring to stop rotating while allowing the first gear ring to rotate. Even more preferably, the coupling device includes a coupling plate engaging the lever;
a biasing member for biasing the coupling plate to a first position along a biasing axis, such that the lever causes the first gear ring to stop rotating while allowing the second gear ring to rotate; and a coupling disk for moving the coupling plate against the biasing member to a second position such that lever causes the second gear ring to stop rotating while allowing the first gear ring to rotate wherein the coupling plate and the coupling disk have matching tilted surfaces engaging each other, said tilted surfaces are at an angle with respect to the biasing axis.

Alternatively, the automatic gear-shift drive mechanism includes first and second clamp rings for respectively clamping the first and second gear rings, said first clamp ring being capable of clamping the first gear ring to stop the first gear ring from rotating when the automatic gear-shift drive mechanism is driven and the workload is below the threshold, and said second clamp ring being capable of clamping the second gear ring to stop the second gear ring from rotating when the automatic gear-shift drive mechanism is driven and the workload is at or above the threshold. More preferably, the first and second clamp rings are expandable such that when the first clamp ring or the second claim ring expands, the respective first gear ring or the second gear ring is not clamped; and the automatic gear-shift drive mechanism has a lever that is biased to expand the second clamp ring when the automatic gear-shift drive mechanism is started being driven and the workload is below the threshold, and switches to expand the first clamp ring when the automatic gear-shift drive mechanism is started being driven and the workload is at or above the threshold. Even more preferably, the automatic gear-shift drive mechanism includes a coupling device that drives the output shaft, and when the automatic gear-shift drive mechanism is started being driven and the workload is below the threshold, said coupling device biases the lever to cause the first gear ring to stop rotating while allowing the second gear ring to rotate; and when the automatic gear-shift drive mechanism is started being driven and the workload is at or above the threshold, the coupling device actuates the lever to cause the second gear ring to stop rotating while allowing the first gear ring to rotate. Additionally, the coupling device includes a coupling plate engaging the lever;

a biasing member for biasing the coupling plate to a first position along a biasing axis, such that the lever causes the first gear ring to stop rotating while allowing the second gear ring to rotate in the first position; and a coupling disk for moving the coupling plate against the biasing member to a second position such that lever causes the second gear ring to stop rotating while allowing the first gear ring to rotate wherein the coupling plate and the coupling disk have matching tilted surfaces engaging each other, said tilted surfaces are at an angle with respect to the biasing axis.

Preferably, the food-drying device of the current invention is driven by hand.

It is another aspect of this invention to provide an automatic gear-shift drive mechanism for driving a device including 1) a first gear system having a first amplification speed, and 2) a second gear system that can couple with the first gear system to form a coupled first and second gear system having a second amplification speed wherein the first amplification speed is higher than the second amplification speed;

the food-drying device carries a workload;

when the automatic gear-shift drive mechanism is started being driven, the automatic gear-shift drive mechanism is biased to provide an output for the device with the first gear system when the automatic gear-shift drive mechanism is driven and the workload is below a threshold, and switch to provide the output for the device with the coupled first and the second gear system when the automatic gear-shift drive mechanism is driven and the workload is at or above the threshold.

Preferably, the first gear system and the second gear systems are respective first and second planetary gear systems; and the automatic gear-shift drive mechanism provides the output for the device through an output shaft that rotates about an output axis; the first and second planetary gear systems have respective first and second gear rings and first and second planetary gears, and said first and second gear rings rotates about the output axis, while at any time, only one of the first gear ring and the second gear ring is allowed to rotate about the output axis. More preferably, when the automatic gear-shift drive mechanism provides the output with the first planetary gear system, the first planetary gear system drives the output shaft and the output shaft drives the second planetary gear system; and when the automatic gear-shift drive mechanism provides the output with the coupled first and second planetary gear systems, the first planetary gear system drives the second planetary gears, and second planetary gears drive the output shaft.

Optionally, the automatic gear-shift drive mechanism further includes a lever, and when the automatic gear-shift drive mechanism is started being driven and the workload is below the threshold, the lever is biased to cause the first gear ring to stop rotating while allowing the second gear ring to rotate; and when the automatic gear-shift drive mechanism is started being driven and the workload is at or above the threshold, the lever switches to cause the second gear ring to stop rotating while allowing the first gear ring to rotate. More preferably, the automatic gear-shift drive mechanism further includes a coupling device that drives the output shaft, and when the automatic gear-shift drive mechanism is started being driven and the workload is below the threshold, said coupling device biases the lever to cause the first gear ring to stop rotating while allowing the second gear ring to rotate; and when the automatic gear-shift drive mechanism is started being driven and the workload is at or above the threshold, the coupling device actuates the lever to cause the second gear ring to stop rotating while allowing the first gear ring to rotate.

Alternatively, the automatic gear-shift drive mechanism includes first and second clamp rings for respectively clamping the first and second gear rings, said first clamp ring being capable of clamping the first gear ring to stop the first gear ring from rotating when the automatic gear-shift drive mechanism is started being driven and the workload is below the threshold, and said second clamp ring being capable of clamping the second gear ring to stop the second gear ring from rotating when the automatic gear-shift drive mechanism is started being driven and the workload is at or above the threshold. More preferably, the first and second clamp rings are expandable such that when the first clamp ring or the second claim ring expands, the respective first gear ring or the second gear ring is not clamped; and the automatic gear-shift drive mechanism has a lever that is biased to expand the second clamp ring when the automatic gear-shift drive mechanism is started being driven and the workload is below the threshold, and switches to expand the first clamp ring when the automatic gear-shift drive mechanism is started being driven and the workload is at or above the threshold. More preferably, the automatic gear-shift drive mechanism further includes a coupling device that drives the output shaft, and when the automatic gear-shift drive mechanism is started being driven and the workload is below the threshold, said coupling device biases the lever to cause the first gear ring to stop rotating while allowing the second gear ring to rotate; and when the automatic gear-shift drive mechanism is started being driven and the workload is at or above the threshold, the coupling device actuates the lever to cause the second gear ring to stop rotating while allowing the first gear ring to rotate. Additionally, the coupling device includes a coupling plate engaging the lever;
    a biasing member for biasing the coupling plate to a first position along a biasing axis, such that the lever causes the first gear ring to stop rotating while allowing the second gear ring to rotate; and
    a coupling disk for moving the coupling plate against the biasing member to a second position such that lever causes the second gear ring to stop rotating while allowing the first gear ring to rotate
    wherein the coupling plate and the coupling disk have matching tilted surfaces engaging each other, said tilted surfaces are at an angle with respect to the biasing axis.

It is yet another aspect of this invention to provide a coupling device for actuating a biased lever including a coupling plate engaging the lever;
    a biasing member for biasing the coupling plate to a first position along a biasing axis; and
    a coupling disk for moving the coupling plate against the biasing member to a second position
    wherein the coupling plate and the coupling disk have matching tilted surfaces engaging each other, said tilted surfaces are at an angle with respect to the biasing axis.

BRIEF DESCRIPTION OF THE DRAWINGS

Preferred embodiments of the present invention will now be explained by way of example and with reference to the accompanying drawings in which.

DETAILED DESCRIPTION OF THE PREFERRED EMBODIMENTS

Figure 1:
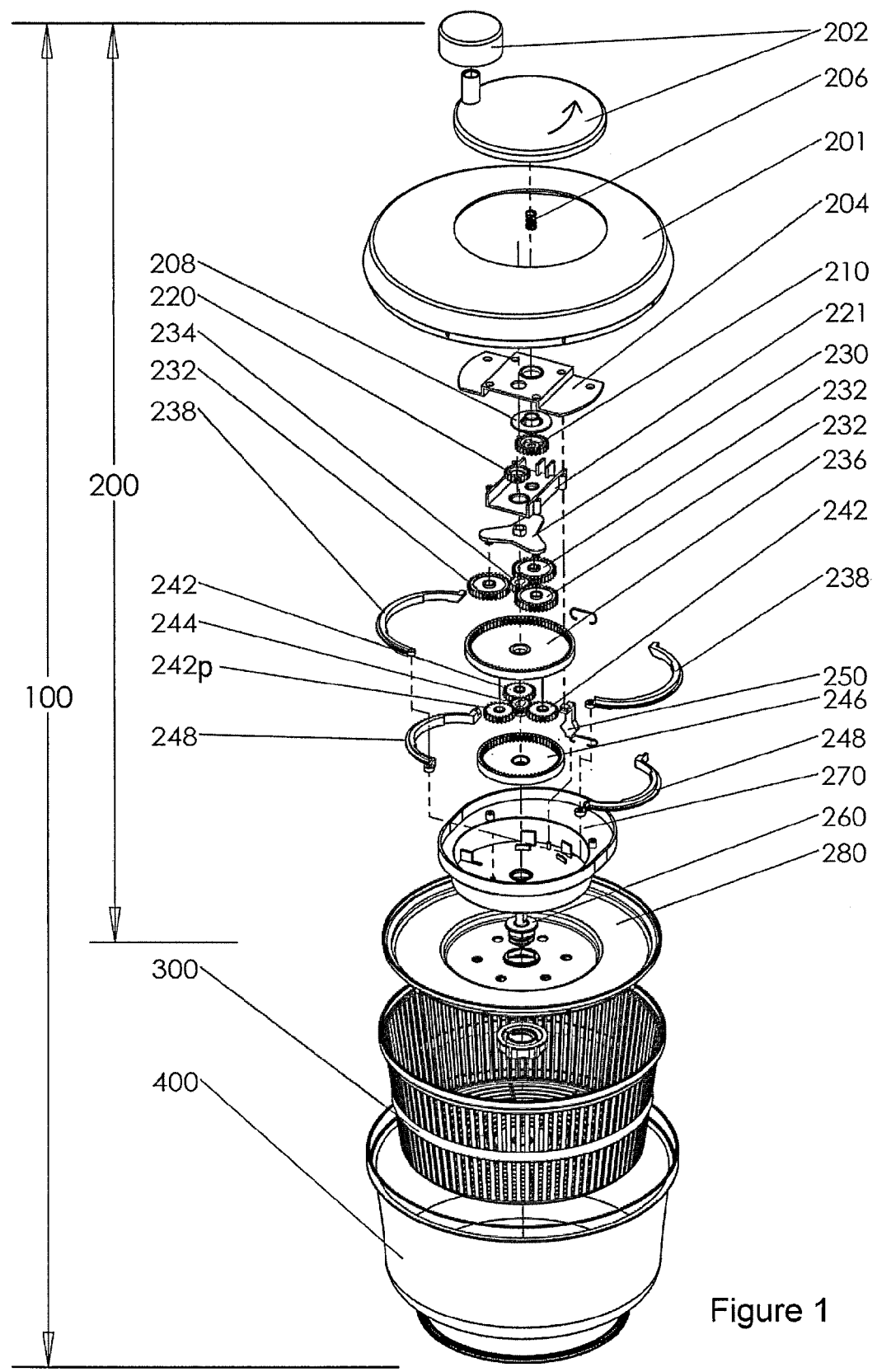
FIG. 1 shows an exploded view of an exemplary food-drying device of this invention.

This invention is now described by way of examples with reference to the figures in the following paragraphs. Objects, features, and aspects of the present invention are disclosed in or are apparent from the following description. It is to be understood by one of ordinary skilled in the art that the present discussion is a description of exemplary embodiments only, and is not intended as limiting the broader aspects of the present invention, which broader aspects are embodied in the exemplary constructions. List 1 is a list showing the parts and respective reference numerals in the figures.

| List 1 | |
|---|---|
| Reference numeral | Part name |
| 100 | Food-drying device |
| 200 | Automatic gear-shift drive mechanism |
| 201 | Drive mechanism top cover |
| 202 | Input handle |
| 204 | Input connecting plate |
| 206 | Biasing member |
| 208 | Coupling plate |
| 210 | Coupling disk |
| 220 | Output shaft gear |
| 221 | Coupling disk seat plate |
| 230 | First planetary gears driving plate |
| 232 | First planetary gears |
| 234 | First sun gear |
| 236 | First gear ring |
| 237 | Pin |
| 238 | First clamp ring |
| 242 | Second planetary gears |
| 244 | Second sun gear |
| 246 | Second gear ring |
| 248 | Second clamp ring |
| 250 | Lever |
| 260 | Output shaft |
| 270 | Drive mechanism bottom cover |
| 280 | Drying assembly connecting plate |
| 300 | Drying assembly |
| 400 | Container |

The exploded view of an exemplary food-drying device 100 of the current invention is shown in FIG. 1. The food-drying device 100 has an automatic gear-shift drive mechanism 200 for spinning the drying assembly 300, which is in the form of a basket having a plurality of bores in this particular embodiment. The drying assembly 300 is contained in a container 400. The automatic gear-shift drive mechanism 200, the drying assembly 300, and the container 400 can be in any desire shape, for example the general cylindrical shape as shown in FIG. 1, or general quadrate shape. Naturally, the automatic gear-shift drive mechanism 200, the drying assembly 300, and the container 400 should match each other or at least be able to accommodate each other.

Figure 2A:
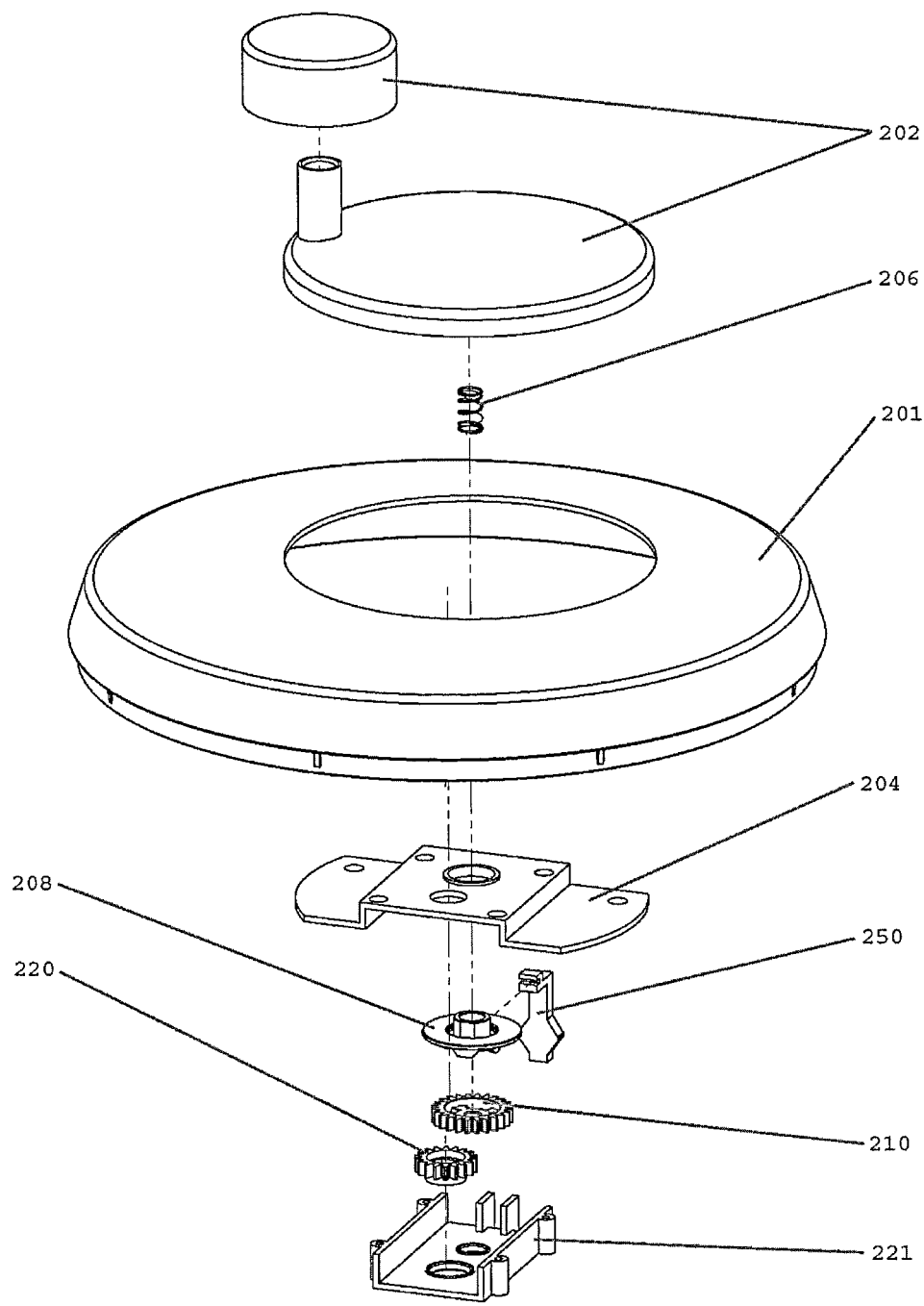
FIG. 2*a* shows an exemplary coupling device of the food-drying device of FIG. 1.
Figure 2B:
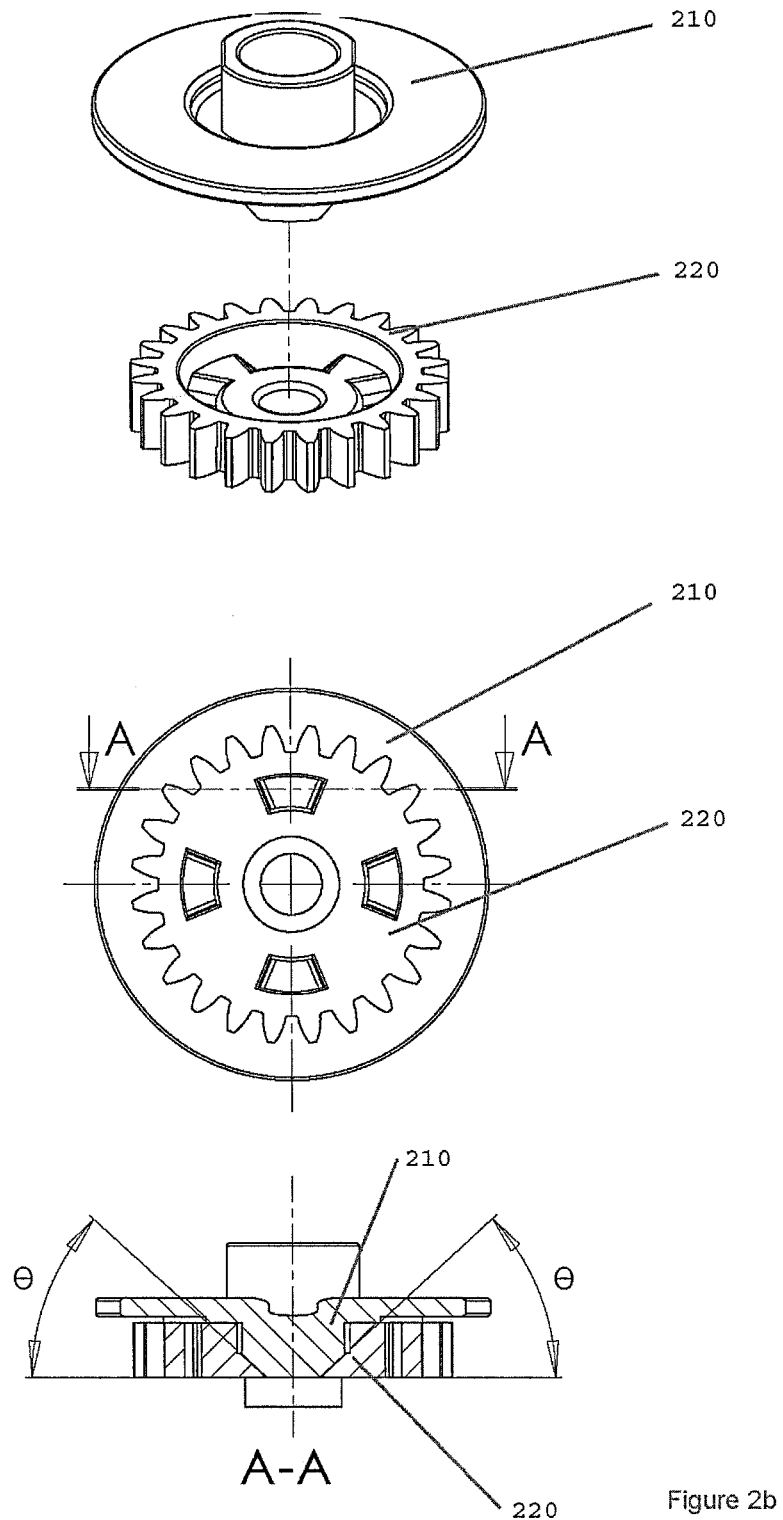
FIG. 2*b* shows the perspective and sectional views of the coupling plate and coupling disk of the coupling device of FIG. 2*a*.

The input handle 202, which is in the form of a rotatable handle in the exemplary food-drying device 100 in FIG. 1, is able to drive the output shaft gear 220 about an output axis through the coupling plate 208 and the coupling disk 210, which is connected to the drive mechanism top cover 201 through the coupling plate 208. The coupling plate 208 engages the lever 250, which will be shown in subsequent figures. A biasing member 206, which is shown as a spring in FIG. 1, is provided to bias the coupling plate 208 along a biasing axis. The coupling plate 208 and coupling disk 210 have matching tilted surfaces engaging each other, while the tilted surfaces are at an angle with respect to the biasing axis. More specifically, the biasing member 206, the coupling plate 208, the coupling disk 210 and the lever 250 may be collectively named as a coupling device as shown in FIG. 2a. This coupling device includes the coupling plate 208 engaging the lever 250; the biasing member 206 for biasing the coupling plate 208 to a first position along a biasing axis; and a coupling disk 210 for moving the coupling plate 208 against the biasing member 206 to a second position, wherein the coupling plate 208 and the coupling disk 210 have matching tilted surfaces engaging each other, said tilted surfaces are at an angle θ with respect to the biasing axis as shown in FIG. 2b. The coupling device including the biasing member 206, the coupling plate 208, coupling disk 210 and the lever 250 are involved in the automatic gear-shift, which will be explained later in more detail. In this particular example, the biasing axis is parallel to the output axis. However, the biasing axis can be at any angle with respect to the output axis.

The automatic gear-shift drive mechanism 200 is enclosed by the drive mechanism top cover 201 and the drive mechanism bottom cover 270, which are optional and the enclosure can be partial or even absent. However, complete enclosure of the automatic gear-shift drive mechanism 200 is preferred for better protection and providing better support of the various components of the automatic gear-shift drive mechanism 200.

Figure 3A:
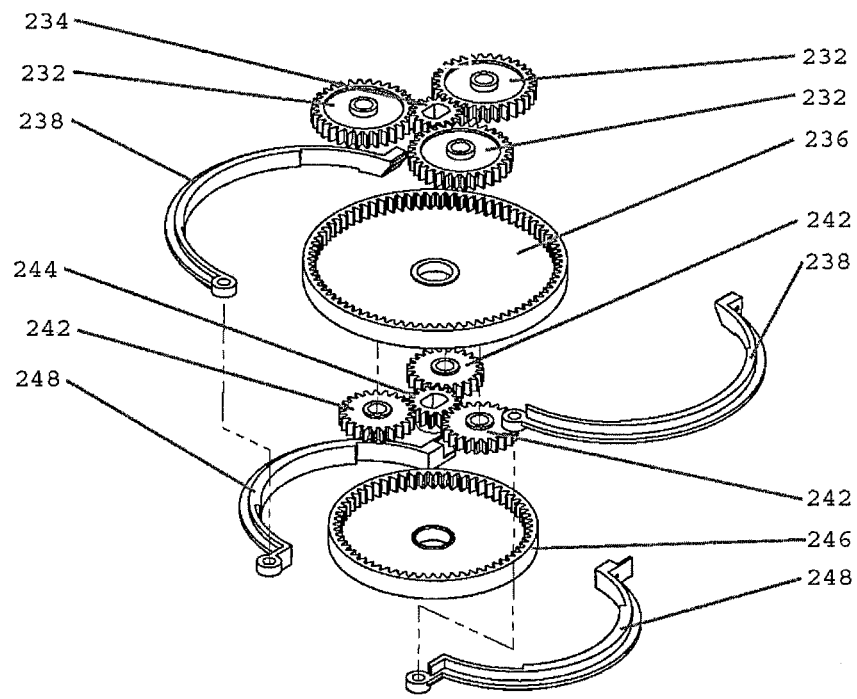
FIG. 3*a* shows the planetary gear systems of the food-drying device of FIG. 1.

FIG. 3a shows the perspective view of the coupled planetary gear systems. In this specific example, the output shaft gear 220 drives the first planetary gears 232 through the first planetary driving plate 230, which can be replaced by other suitable driving mechanisms, for example three driving bars connecting the output shaft gear 220 and the first planetary gears 232. The first planetary gears 232 in turn drive the first sun gear 234. The first planetary gears 232 mesh with the first gear ring 236 and rotate within the first gear ring 236. The first gear ring 236 can rotate about the output axis unless the first gear ring 236 is engaged by a first stopping member. In this specific example, this first stopping member is a first clamp ring 248, and the first gear ring 246 can be clamped by this first clamp ring 248. In another words, the first gear ring 236 is caused to stop rotating about the output axis when it is clamped by the first clamp ring 238. The first planetary gears 232, the first sun gear 234, and the first gear ring 236 collectively form the first planetary gear system. There are three first planetary gears in this particular embodiment, but the number of the first planetary gears 232 can be any number from one to six. However, three planetary gears are preferred due to balance of stability and size of the first planetary system.

Figure 3B:
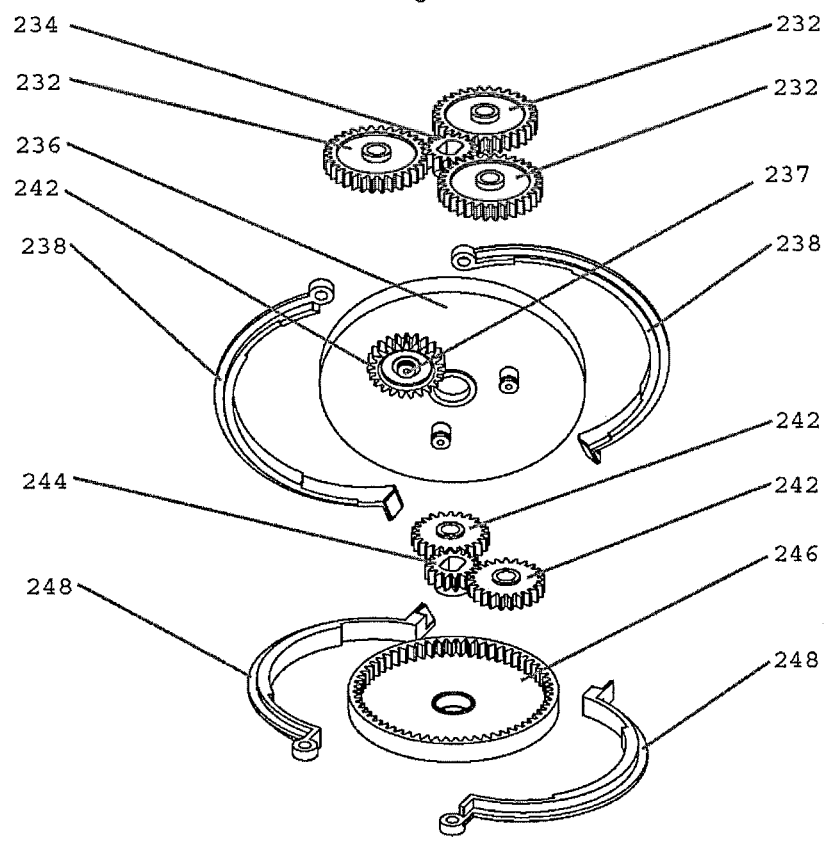
FIG. 3*b* shows a gear pivoted at a pin in connection with the upper gear ring in FIG. 3*a*.

Similarly, a second planetary gear system has second planetary gears 242, second sun gear 244, and second gear ring 246. However, in this second planetary gear system, the second sun gear 244 is either driven by the first sun gear 234 and drives the secondary planetary gears 242, or is driven by the first sun gear 234 and the secondary planetary gears 242 depending on whether gear shift has occurred, which will be explained below. The second planetary gears 242 mesh with the second gear ring 246 and rotate within the second gear ring 246. Additionally, at least one of the secondary planetary gears 242 is fixed to rotate about a pivoted protrusion 237, in the form of pin, from the bottom of the first gear ring 236, although as shown in FIG. 3b all of the secondary planetary gears 242 are fixed to rotate at respective pivoted protrusion 237 for better stability of the rotation.

As in the first planetary gear system, the number of the second planetary gears 242 can be any number from one to six, preferably three. The second gear ring 246 can rotate about the output axis unless the second gear ring 246 is engaged by a second stopping member. In this specific example, this second stopping member is a second clamp ring 248, and the second gear ring 246 can be clamped by this second clamp ring 248. In another words, the second gear ring 246 is caused to stop rotating about the output axis when it is clamped by the second clamp ring 248.

The first sun gear 234 and the second sun gear 244 are both connected to the same output shaft, and when the first sun gear 234 is driven to rotate, the second sun gear 244 is also driven to rotate.

The first and the second planetary gear systems can be coupled to form a coupled first and second gear system. With this coupled configuration, the output shaft can be driven by one of the following input driving states:

High Amplification or Expand State is driven by the first planetary gear system with the stopping member first clamp ring 238 engaged such that the first gear ring 236 is clamped and stopped. In this expand state, as the first gear ring 236 is stopped to rotate, the second planetary gears 242 are only driven to rotate by the second sun gear 244, for which the second sun gear 244 is driven by the first sun gear 234. Here the speed of the drive mechanism is governed by the first sun gear 234 amplified through the rotation of first planetary gears 232 around the clamped first gear ring 236.

Low Amplification or Contract State is driven by the coupled first and second gear system with the stopping member second clamp ring 248 engaged such that the second gear ring 246 is clamped and stopped. Here the first gear ring 236 is free to rotate, hence driving the second planetary gear system in motion via the second planetary gears 242. The resulting speed amplification of the drive mechanism is given by the coupled first and second planetary gear systems combined.

The coupled gear systems of the current invention can be extended to include the third, the fourth and so forth beyond the second planetary system if more speed amplification selections are desired. Calculations of the resultant speed amplification of this coupled drive mechanism will be given later.

An output shaft 260 is provided and is driven by, in sequence in the particular example shown in FIG. 1, the input handle 202, the coupling plate 208, the coupling disk 210, the output shaft gear 220, the first sun gear 234, and then the second sun gear 244. It should be noted that for clarity the full length of the output shaft 260 and its connection with the output shaft gear 220, the first sun gear 234 and the second sun gear 244 are not shown in FIG. 1. The output shaft 260 then drives the drying assembly 300 through an optional drying assembly connecting plate 280. Alternatively, the output shaft 260 can extend and connect to the drying assembly 300 for driving the drying assembly 300 directly.

The food-drying device 100 carries a workload, which is to be driven by the automatic gear-shift drive mechanism 200. This workload refers to all loading of the automatic gear-shift drive mechanism 200 including the weight of the food carried in the drying assembly 300, the weight of the automatic gear-shift drive mechanism 200 itself, and the weight of the drying assembly 300. The workload of the food-drying device 100 is mainly varied by the weight of the food carried in the drying assembly 300. To dry the food as quickly as possible, the drying assembly 300 is preferred to be driven at as high speed as possible. This is not difficult when the workload is low, in which the driving process is easy to be started. However, when the workload is high, it takes more effort to start the driving process at high speed amplification, and therefore, it is preferred to start the driving process at lower speed amplification so that it can be more comfortable to the user. As such, the automatic gear-shift drive mechanism 200 allows automatic gear shift to optimize the comfort of operation. That is, if the workload is below the preset threshold, the food drying device 100 operates like existing similar devices, and the food drying device 100 is at a high speed amplification setting and the drying assembly 300 can be driven at high speed. If the workload is at or above the preset threshold, the automatic gear-shift drive mechanism 200 momentarily shifts to a lower speed amplification state to facilitate the initial start. The automatic gear-shift mechanism 200 shifts from low to high speed amplification as the angular speed increases. This will be explained in more detail later.

Referring to FIG. 3a, as the first sun gear 234 and the second sun gear 244 will rotate when the output shaft 260 is driven, the first planetary gears 232 and the second planetary gears 242 will also rotate. However, the first gear ring 236 and the second gear ring 246 may or may not rotate about the output axis depending on whether the first gear ring 236 is clamped by the first clamp ring 238 at High Amplification or Expand State, or whether the second gear ring 246 is clamped by the second clamp ring 248 at Low Amplification or Contract State. Further, when the second gear ring 246 is able to rotate about the output axis, then the second planetary gears 242 are driven by the second sun gear 244. By contrast, when the first gear ring 236 is able to rotate about the output axis, then the second planetary gears 242 actively drive the second sun gear 244. As explained above, the first (236) or the second (246) gear ring is caused to stop rotating about the output axis when it is clamped by the respective first (238) or second (248) clamp ring. More specifically, when the automatic gear-shift drive mechanism 200 is started being driven and the workload is below the threshold, the output shaft 260 and therefore the drying assembly 300 is actively driven with the first gear system, in which the first gear ring 236 is caused to stop rotating while allowing the second gear ring 246 to rotate about the output axis, in which the first clamp ring 238 clamps the first gear ring 236, and the second clamp ring 248 does not clamp the second gear ring 246. When the automatic gear-shift drive mechanism 200 is started being driven and the workload is at or above the threshold, the output shaft 260 and therefore the drying assembly 300 is actively driven with the coupled first and the second gear systems, in which the second gear ring 246 is caused to stop rotating while allowing the first gear ring 236 to rotate about the output axis, in which the second clamp ring 248 clamps the second gear ring 246, and the first clamp ring 238 does not clamp the first gear ring 236. However, at any time, only one of the first gear ring and the second gear ring is allowed to rotate about the output axis.

The first clamp ring 238 and the second clamp ring 248 are shown in their dissembled state, each in two halves, in FIG. 3a. These two halves are in engagement in the operating assembly of the food-drying device 100, making the clamp ring expandable. In the specific embodiment shown in FIG. 3a, the first clamp ring 238 and the second clamp ring 248 are expandable in a direction generally perpendicular to the output axis. Whether the first clamp ring 238 or the second clamp ring 248 expands is controlled by the position of the lever 250.

Figure 4:
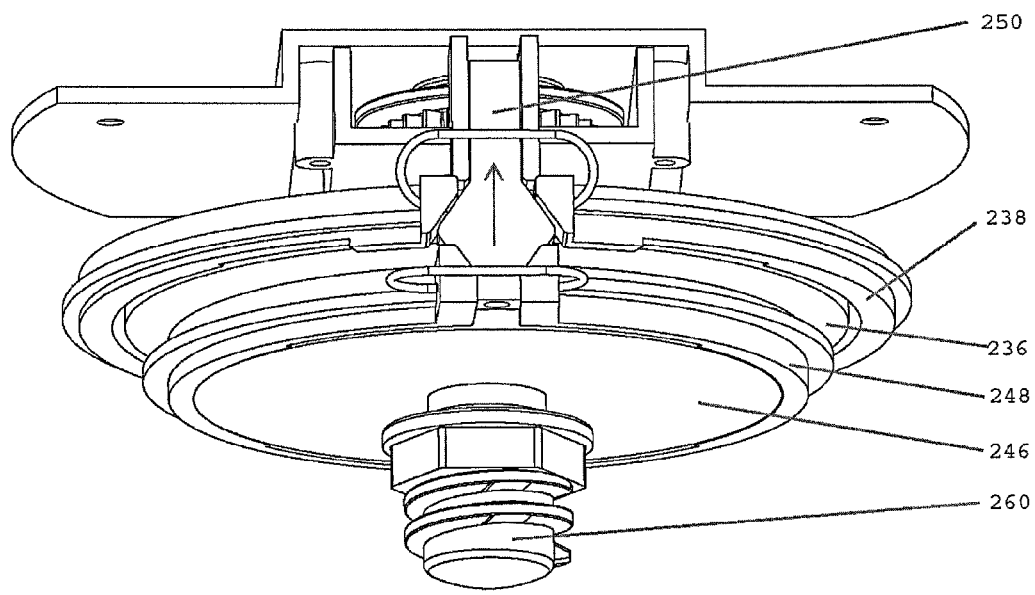
FIG. 4 shows the action of the lever to engage to a low speed amplification state.

As shown in FIG. 4, when the automatic gear-shift driving mechanism 200 is driven and the workload is at or above the threshold, the lever 250 is in a position engaging the first clamp ring 238 and causes the first clamp ring 238 to expand, such that the first clamp ring 238 does not clamp the first gear ring 236. On the other hand, the second clamp ring 248 contracts and clamps the second gear ring 246.

Figure 5:
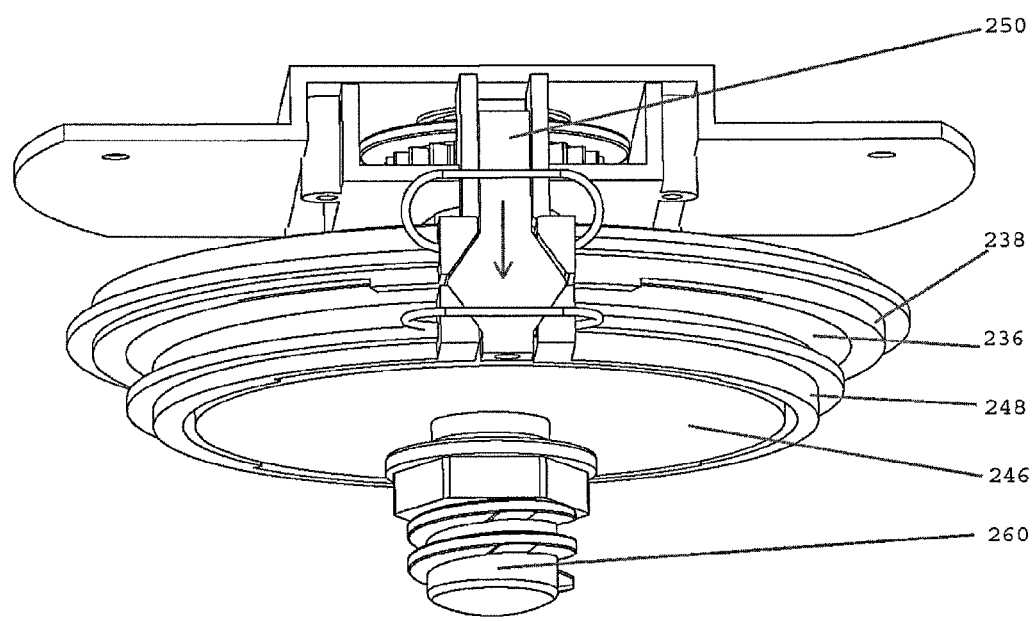
FIG. 5 shows the action of the lever to engage to a high speed amplification state.

As shown in FIG. 5, when the automatic gear-shift driving mechanism 200 is driven and the workload is below the threshold, the lever 250 is in a position engaging the second clamp ring 248 and causes the second clamp ring 248 to expand, such that the second clamp ring 248 does not clamp the second gear ring 246. On the other hand, the first clamp ring 238 contracts and clamps the first gear ring 236. The direction of the movement of lever 250 that triggers the expand or contract action is governed by the net force acting on the coupling plate. Discussion on the operation of the coupling plate will be given later.

The lever 250 has an enlarged portion, such that when this enlarged portion engages the first clamp ring 238 or the second clamp ring 248, the respective clamp ring is expanded. The lever 250 is biased to expand the second clamp ring 248 and close the first clamp ring 238 when the automatic gear-shift driving mechanism 200 is driven and the workload is below the threshold. In this case, the output shaft 260 and therefore the drying assembly 300 are driven with the first gear system of high amplification speed or gear ratio. This is because if the workload is low, it is easy for the user to start spinning at high speed so that the drying process can finish earlier. However, if the workload is so high that it is at or above the threshold, it takes more effort to initiate at high speed first, and the user prefers to initiate the motion at a lower speed and then switch to high speed. In this case, the lever 250 is actuated to close the second clamp 248 and expand the first clamp ring 238 such that the output shaft 260 and therefore the drying assembly 300 are driven by the coupled first and the second gear systems, which in combination has a lower amplification speed.

Figure 6A:
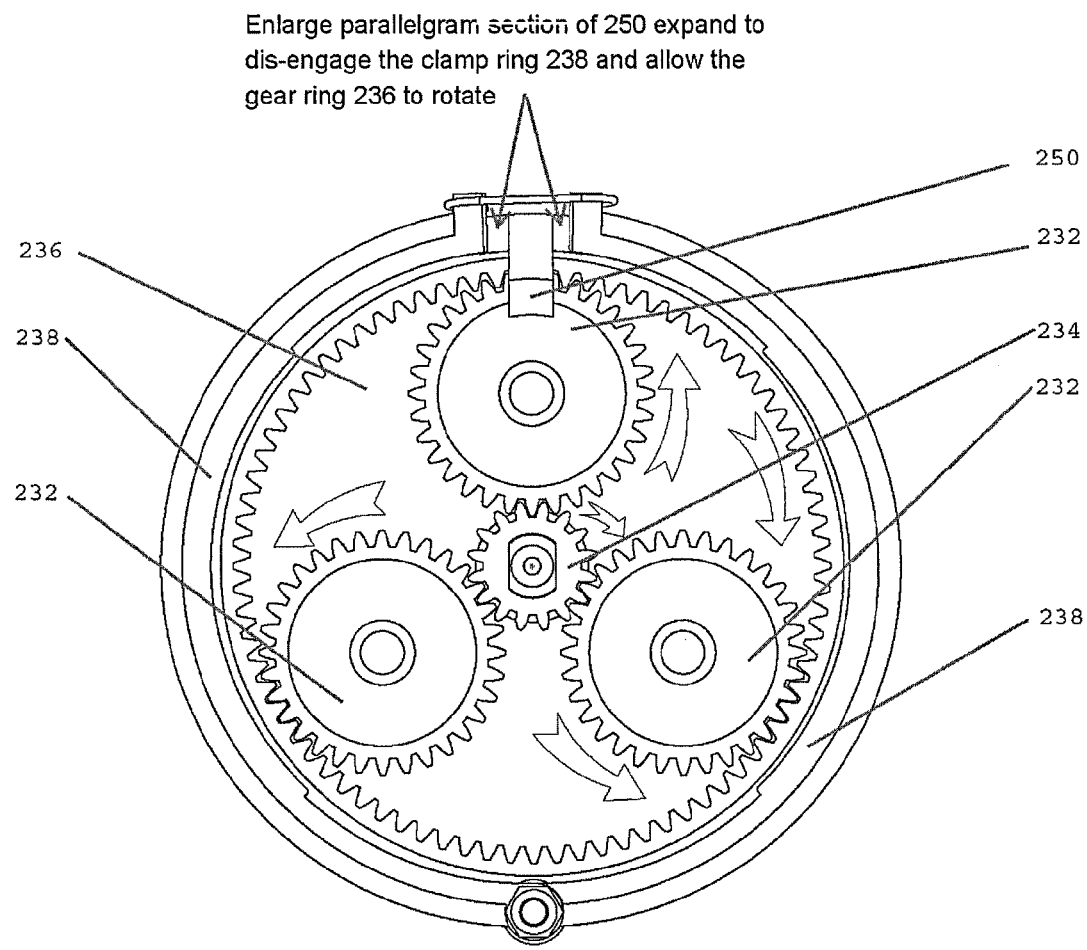
FIG. 6*a* shows the motion of a planetary gear system in an expand state.
Figure 6B:
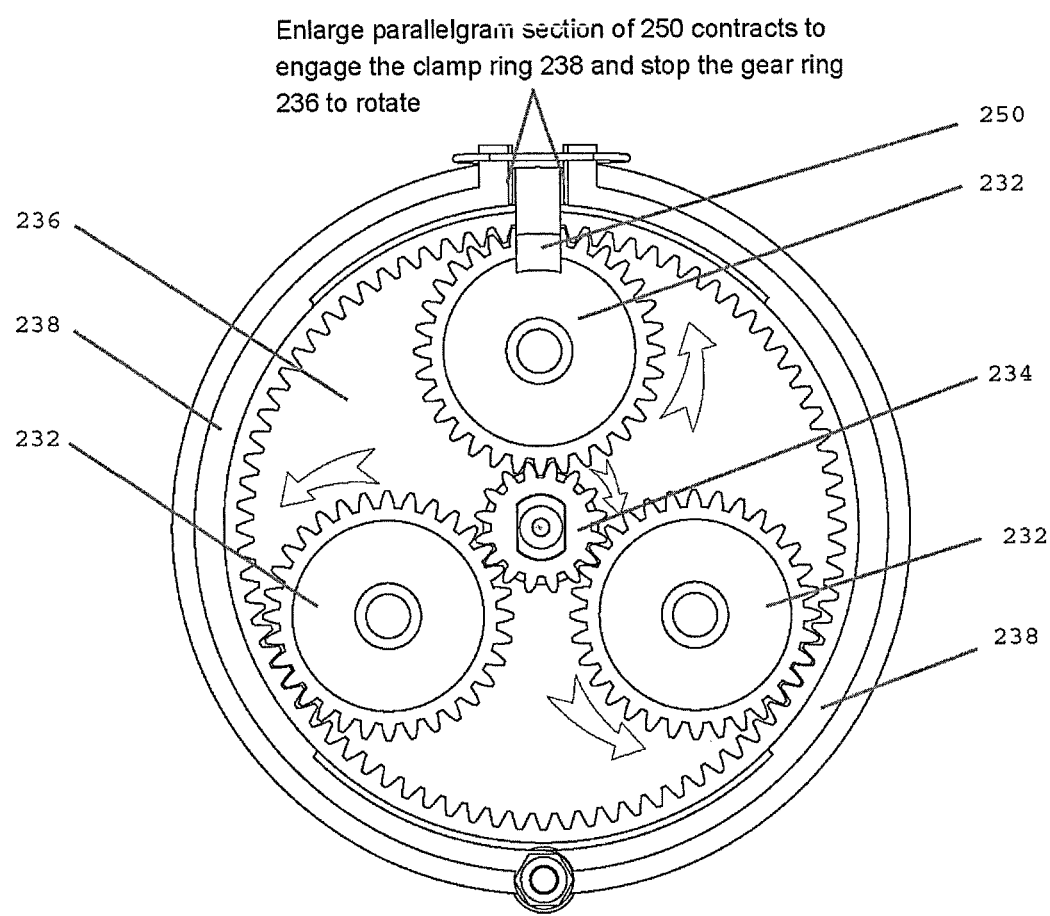
FIG. 6*b* shows the motion of a planetary gear system in a contract state.

Movement of the enlarged portion of the lever 250 provides expand and contract constraints to the clamp rings 238 and 248, acting like an on/off switch. This causes clamp ring 238 to expand while clamp ring 248 to contract, or vice versa. FIG. 6 shows the rotation of the planetary gears and the gear ring in "expand" and "contract" states. When the planetary gear system is in the "expand" state, the sun gear rotates about the output axis, the planetary gears rotate within the gear ring, and the gear ring rotates about the output axis. When the planetary gear system is in the "contract" state, the sun gear rotates about the output axis, the planetary gears rotate within the gear ring, but the gear ring is clamped to stop and cannot rotate about the output axis.

Figure 7A:
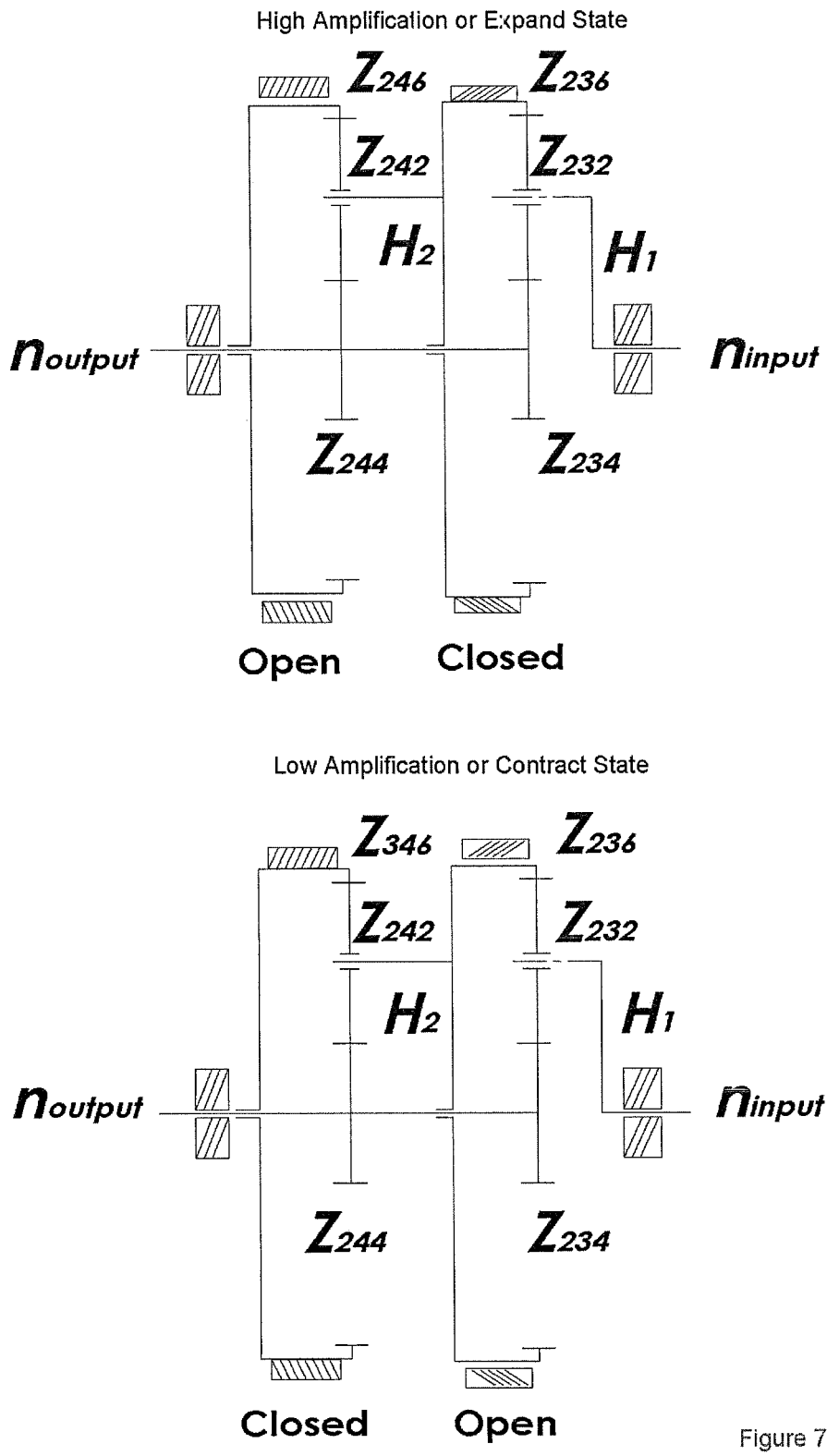
FIG. 7*a* shows the schematics of the planetary gear systems of the food-drying device of FIG. 1.
Figure 7B:
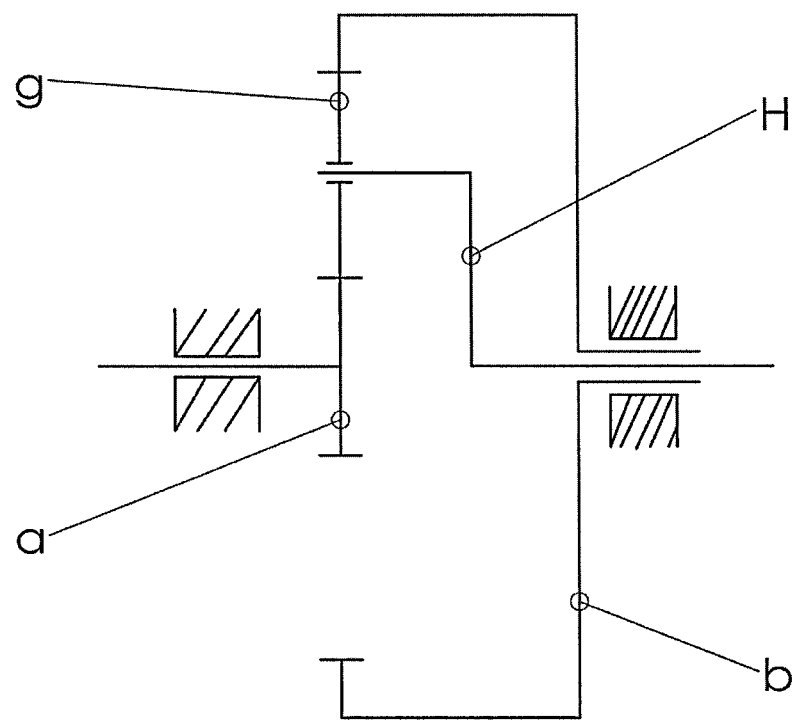
FIG. 7*b* shows a simple single stage planetary system driven by a handle.

FIG. 7a shows the configuration of the first and second planetary gear systems in the "High Speed Amplification (expand)" and "Low Speed Amplification (contract)" states, in which only one planetary gear in each of the first and second planetary systems is shown for clarity. To simplify the mathematics, let's assume that the sun gears 234 and 244 are identical and have the same number of teeth, which however can be different. Calculations of the relative speed of the input and output in FIG. 7a configuration are shown below:

For a single stage planetary gear system being driven by an input handle H with a sun gear a, gear ring b and planetary gears g as shown in FIG. 7b, the relationship of the relative speed between a,b with reference to H is given by the following equalities [1] and [2]

$$i_{ab}^H = -\frac{Z_b}{Z_a} \quad [1]$$

$$i_{ab}^H = \frac{(n_a - n_H)}{(n_b - n_H)} = -\frac{Z_b}{Z_a} \quad [2]$$

where $i_{ab}^H$ is the speed of sun gear a relative to gear ring b with respect to the handle H, and $n_a$, $n_b$, and $n_H$ are the respective speeds of a, b, H, and $Z_a$, $Z_b$ are the respective number of teeth for a and b. The negative sign indicates that a and b are turning in opposite direction.

Applying equations [1] and [2] to the configuration in FIG. 7a results in

Case [A] High Amplification (Open) State:

Apply Equation [2] with reference to $H_1$ results in $$\frac{(n_{Z_{234}} - n_{H_1})}{(n_{Z_{236}} - n_{H_1})} = -\frac{Z_{236}}{Z_{234}} \quad [3]$$

but as $n_{H_1}=n_{input}$, $n_{Z_{234}}=n_{output}$ and $n_{Z_{236}}=0$, Equation [3] reduces to $$\frac{(n_{output} - n_{input})}{(0 - n_{input})} = -\frac{Z_{236}}{Z_{234}}$$

implying the relative speed at High Amplification State $$\frac{n_{output}}{n_{input}} = 1 + \frac{Z_{236}}{Z_{234}} \quad [4]$$

or $$\frac{(Z_{234} + Z_{236})}{Z_{234}}$$

Case [B] Low Amplification (Closed) State:

Again, using Equation [2] with reference to $H_2$ and $H_1$ respectively in this case results in Equations [5] and [6]

$$\frac{(n_{Z_{244}} - n_{H_2})}{(n_{Z_{246}} - n_{H_2})} = -\frac{Z_{246}}{Z_{244}} \quad [5]$$

$$\frac{(n_{Z_{234}} - n_{H_1})}{(n_{Z_{236}} - n_{H_1})} = -\frac{Z_{236}}{Z_{234}} \quad [6]$$

here $n_{Z_{244}}=n_{Z_{234}}=n_{input}$, $n_{Z_{246}}=0$, $n_{H_2}=Z_{236}$, $n_{H_1}=n_{output}$, substituting these into Equations [5] and [6] result in Equations [7] and [8] respectively $$\frac{(n_{input} - n_{Z_{236}})}{(0 - n_{Z_{236}})} = -\frac{Z_{246}}{Z_{244}} \quad [7]$$

$$\frac{(n_{input} - n_{output})}{(n_{Z_{236}} - n_{output})} = -\frac{Z_{236}}{Z_{234}} \quad [8]$$

Equation [7] simplifies to $$n_{Z_{236}} = \left(\frac{Z_{246}}{Z_{244} + Z_{246}}\right) n_{input}$$

and substituting $n_{Z_{236}}$ into Equation [8] results in $$\frac{(n_{input} - n_{output})}{\left(\frac{Z_{246}}{Z_{244} + Z_{246}}\right) n_{input} - n_{output}} = -\frac{Z_{236}}{Z_{234}}$$

and simplifies to $$\frac{n_{output}}{n_{input}} = \frac{(Z_{236} + Z_{234})}{\left[Z_{234} + \frac{(Z_{236} \times Z_{244})}{(Z_{246} + Z_{244})}\right]} \quad [9]$$

Figure 8:
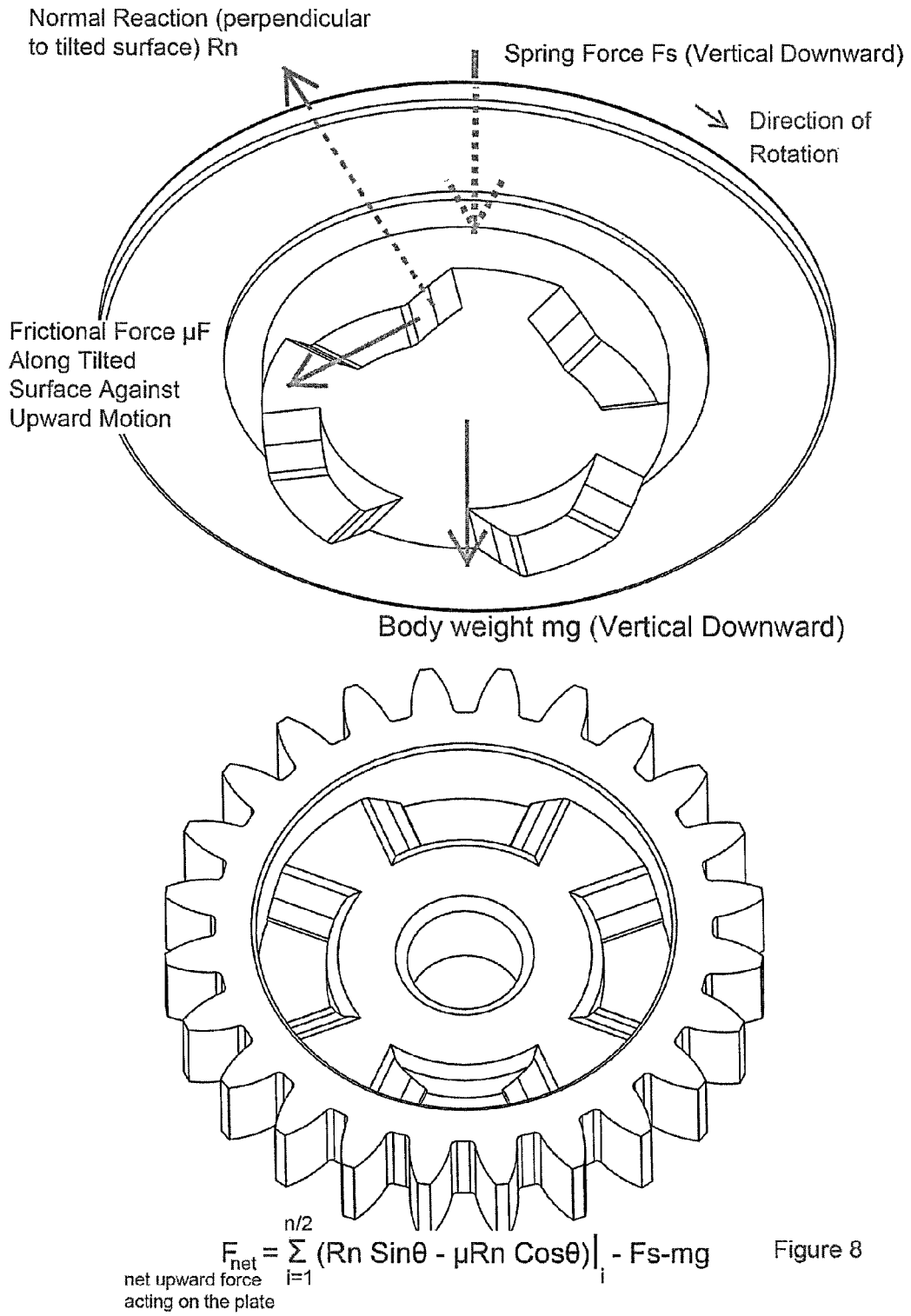
FIG. 8 shows the force diagram acting on the coupling plate.

The direction of the movement of lever 250 that triggers the expand or contract action is governed by the net force acting on the coupling plate. FIG. 8 shows the force diagram acting on the coupling plate 208 when the coupling plate 208 and the coupling disk 210 are rotated. Here forces with the vertical resolved components which are responsible for the gear switching mechanism will be considered. Those forces acting on the horizontal plane, which are normal to the vertical direction such as forces arising from the rotational torque acting on the tilted contact surfaces or any unbalance centrifugal forces arising from rotation, will not be shown. The biasing member 206 exerts a biasing vertical download force $F_S$. Another vertical force equal to the weight of the coupling plate mg acts downward. A normal reaction $R_N$ acts perpendicular to the respective contact surface between the coupling plate and coupling disk, and a frictional force equals to $\mu R_N$ acts downward against any upward motion along the tilted surfaces, where $\mu$ is the coefficient of friction of the tilted contact surface. Forces associated with the mass of the coupling plate are negligibly small comparing with the other forces, and therefore the weight mg will be ignored in the following calculations. The net upward force $F_{net}$ acting on the coupling plate in the vertical direction is given by $$F_{net} = \sum_{i=1}^{\frac{n}{2}} [R_n \sin\theta - \mu R_N \cos\theta]_i - F_s - mg \quad [10]$$

where n is the total number of tilted contact surfaces

If $F_{net}$ is less than zero, that is there is no net upward force, then the coupling disk 210 will not be able to move the coupling plate 208 to trigger the lever 250, and therefore there will be no gear shift. If however $F_{net}$ is greater than zero, there is a net upward force, then the coupling plate 208 will be moved upward by the coupling disk 210, and gear shift will occur.

As explained above, shifting of gear is activated by raising the coupling plate 208 due to the normal reaction forces $R_N$ generated on the tilted contact surfaces of the coupling plate 208 and coupling disk 210. If the sum of all the vertical components of the reaction forces $R_N \sin\theta$ minus all the associated frictional forces and the weight of the coupling plate exceed the preset threshold $F_S$ of the biasing element 206, the coupling plate 208 rises and triggers the linkage lever 250 to change gear. Noted that at the start of the driving process, the user needs to overcome the static frictional force, which is an aggregation of a chain of contact surfaces, namely, handle 202→coupling plate 208→coupling disk 210→connecting gear 270→first planetary gears driving plate 230→planetary gears 232→sun gear (234)→output shaft 260→spinner plate 280→basket 300 plus the secondary planetary gear system driven by the output shaft 260. This aggregation of static frictional forces also increases as the weight of the food to be dried increases. The biasing element 206 is so selected to have a preset threshold $F_S$ such that the automatic gear-shift drive mechanism 200 is biased to drive at high amplification speed should the work load is below the preset threshold. If the sum of the vertical components of the normal reaction forces $R_N \sin \theta$ minus all the associated frictional forces and the weight of the coupling plate exceed the preset threshold of the biasing element 206, the automatic gear-shift drive mechanism 200 changes to a low amplification speed state, as explained above. Once the automatic gear-shift driving mechanism 200 is driven, all the static frictional forces between the gears train quickly diminishes, and is replaced by the rotating frictional forces which is much smaller than the corresponding static frictional forces (for polyacetal, $\mu_{static} \sim 0.2$, $\mu_{rotation} \sim 0.04$, Engineering Principles for Plastic Gear, *Gear Solution Magazine*, October 2004, pp 24-35). This reduction in frictional forces from static to kinetic results in speeding up the rotation due to the subsequent increases in angular acceleration as the motion is started. The applied torque is dissipated primarily by the angular acceleration which dominates the rotational motion.

Now if the motion is constrained such that the sum of all the vertical components of the normal reaction forces between the tilted contact surfaces of the coupling plate 208 and coupling disk 210 at the point of maximum angular acceleration, say $R_{max} \sin \theta$ minus all the associated frictional forces never exceed the preset threshold of the biasing element 206 $F_S$, then the automatic gear-shift drive mechanism 200 will always run at high amplification speed, even if it is momentarily running at low amplification speed at the start operated above the threshold load. In essence, the mechanism always runs at high amplification speed, except during a short transient period at low amplification speed when the food-drying device is operated at/or above threshold load condition at the start so as to facilitate the initiation of the motion.

To calibrate $F_S$ and $R_{max}$ such that $F_S > R_{max}$, this can be done by one or a combination of the following ways:
- adjusting the strength by selecting different spring constants of the biasing member 206, as $F_S$ increases with a higher spring constant;
- adjusting the tilted angle $\theta$ of the tilted contact surfaces, as the sum of the vertical resolved components $R_{max} \sin \theta$ decreases as $\theta$ decreases;
- limiting the speed amplification (gear ratio) of the planetary systems to restrict the maximum angular acceleration physically achievable as $R_{max}$ increases as angular acceleration increases.

By selecting the proper parameters to adjust $F_S$ and $R_{max}$ to limit $F_{net} < 0$ at all time, the food drying device 100 will work as required in the current invention.

Figure 10:
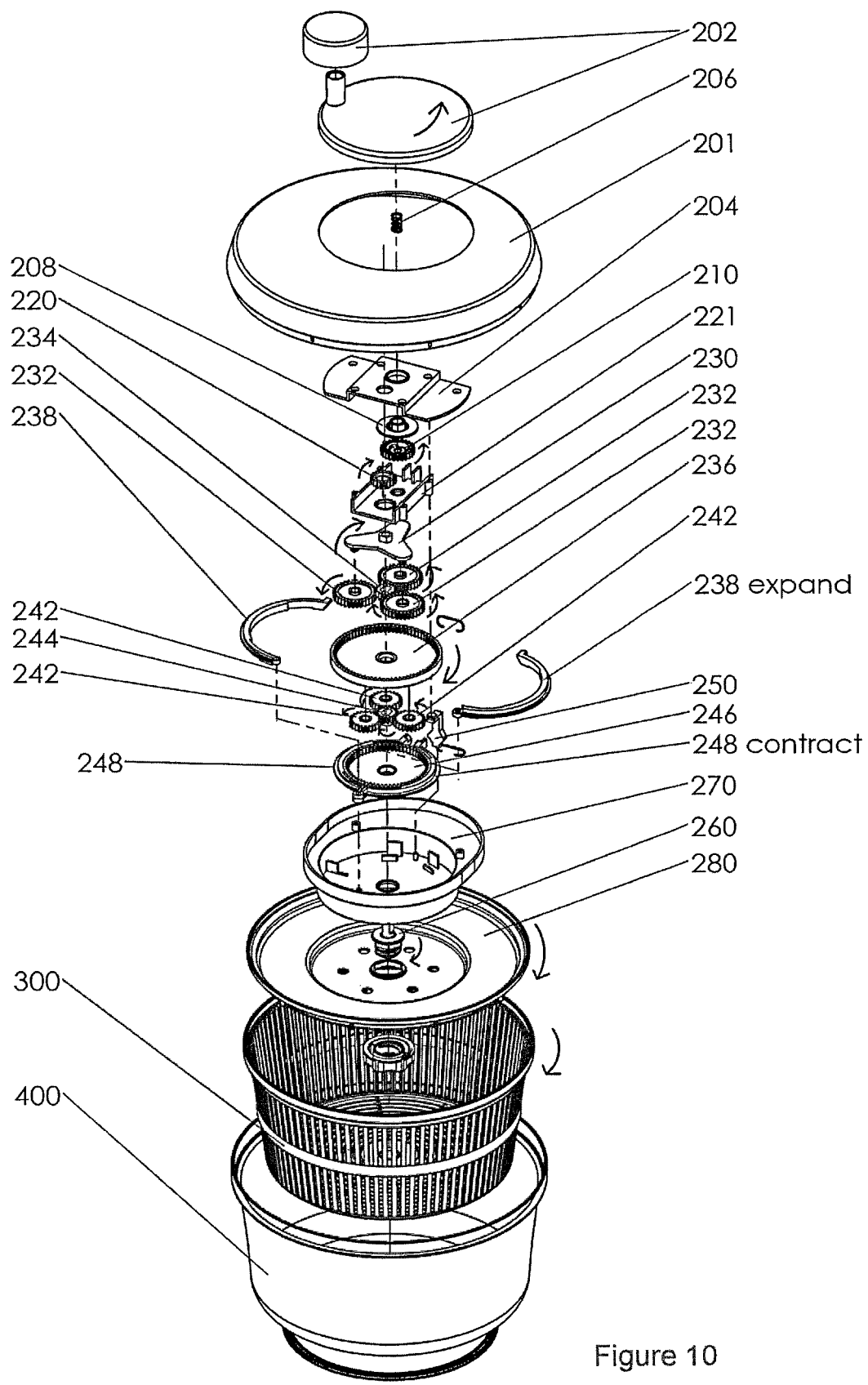
FIG. 10 shows the rotational direction of the gears at low amplification speed state.

Optionally, the coupling plate 208 and the coupling disk 210 can have multiple slots each having respective tilted surfaces, as shown in FIG. 10. The exact shape of the coupling plate 208 and the coupling disk 210 is relatively unimportant as long as they can engage and actuate the lever 250, and having the tilted surfaces for exerting the vertical component $R_N \sin \theta$ of the reaction forces on the respective tilted contact surfaces. The biasing member 206, the coupling plate 208 and the coupling disk 210 are collectively known as the coupling device, which is responsible for actuating the lever 250 according to the workload, as described above. As shown above, as the threshold is related to the spring constant of the biasing member 206 and the angle $\theta$, these can be adjusted to fine tune the threshold, if desired.

Figure 9:
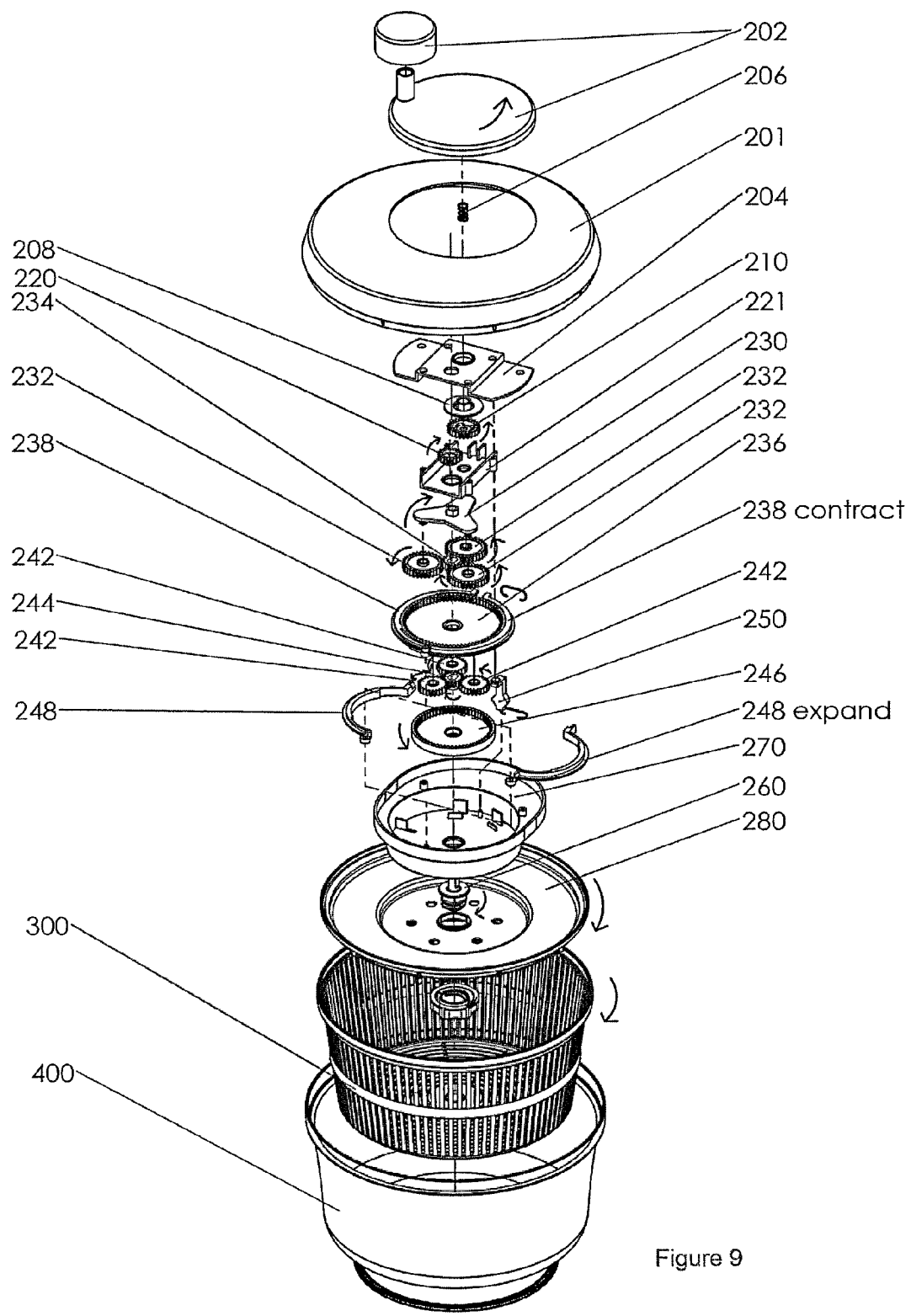
FIG. 9 shows the rotational direction of the gears at high amplification speed state.

FIG. 9 shows the rotation relationships between the various components of the automatic gear-shift drive mechanism 200 at the default biased state or the high gear state of the specific embodiment of this invention in FIG. 1. As explained above, at this default state the first gear ring 236 is clamped and cannot rotate, while the second gear ring 246 is not clamped and is free to rotate about the output axis. When the input handle 202 is driven, the coupling plate 208 and the coupling disk 210 rotate, which in turn drive the output shaft gear 220. The output shaft gear 220 drives the first sun gear 234, which drives the first planetary gears 232 to rotate within clamped first gear ring 236 while the first gear ring 236 is hold stationary by the first clamp ring 238. When the second sun gear 244 rotates, the second planetary gears 242 are driven to rotate about the pin 237 fixed to the first gear ring 236 by the second sun gear 244, and the second planetary gears 242 in turn drives the second gear ring 246 to rotate about the output axis. That is, in this high gear default state, the automatic gear-shift drive mechanism 200 is biased to drive the output shaft 260 and therefore spin the drying assembly 300 with the first gear system. In such a case, the second planetary gear system is a burden to the rotation as it follows the motion of the output shaft and produce unproductive work by dissipating input energy. This is the price that has to be paid to obtain the benefit of switching gear.

FIG. 10 shows the rotation relationships between the various components of the automatic gear-shift drive mechanism 200 at the low gear state after gear shift of the specific embodiment of this invention in FIG. 1. As explained above, in this state the coupling plate 208 is actuated to move upward by the coupling disk 210, and the lever 250 is actuated to "open" the first clamp ring 236 and "close" the second clamp ring 246, that is, the first clamp ring 236 is free to rotate about the output axis while the second clamp ring 246 is not able to rotate about the output axis. Similar as in the high amplification speed state, when the input handle 202 is driven, the coupling plate 208 and the coupling disk 210 rotate, which in turn drive the output shaft gear 220. The output shaft gear 220 drives the first sun gear 234, which drives the first planetary gears 232 to rotate about the output axis. The rotating first gear ring 236 then drives the second planetary gears 242 to rotate about the pin 237 fixed to the first gear ring 236. These rotating second planetary gears 242 driven by the first gear ring 236 then drive the second sun gear 244 in addition to the driven output shaft. That is, the automatic gear-shift drive mechanism 200 switches to drive the output shaft 260 and therefore spin the drying assembly 300 with the first and the second planetary gear systems in this low amplification speed state.

In summary, at the high amplification speed state, the first gear ring 236 is clamped or fixed, the first planetary gear system dominates the motion, and the output shaft 260 is driven by the high amplification speed configuration minus the dissipation of second planetary system. Calculation of the output amplification speed of the high gear state is the simple first planetary gear system as shown in the calculation above.

At the low amplification speed state, the second gear ring 246 is clamped or fixed, and the second planetary gears 242 are driven by the rotational motion of the first gear ring 236. Calculation of the output amplification speed is a combination of the first and the second planetary gear systems as shown in the calculation above.

In the specific embodiment shown in the figures, the food-drying device 100 is driven by hand. However, the food-drying device 100 can also be driven by motor if desired by replacing the input handle 202 by an output shaft of a motor.

The automatic gear-shift mechanism 200 can be used in other devices or tools, for example hand-held power drills, if desired. Further, it is possible to include more than two planetary gear systems as described above to achieve control of more than two speeds if needed by using the current coupled configuration to extend the planetary gear systems.

The coupling device of the current invention can also be independently used in any tools requiring switching action during rotation, for example the gear shift action as in the current invention.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

The invention claimed is:

1. A food-drying device including:
   a container;
   a drying assembly having a plurality of bores, said drying assembly disposed in the container and capable of being spun relative to the container; and
   an automatic gear-shift drive mechanism for spinning the drying assembly relative to the container;
   wherein the food-drying device carries a workload characterized in that
   the automatic gear-shift drive mechanism includes
   a lever,
   first and second clamp rings, and
   a first gear system having a first amplification speed, and a second gear system that can couple with the first gear system to form a coupled first and second gear system having a second amplification speed wherein the first amplification speed is higher than the second amplification speed;
   characterized in that the first gear system and the second gear system are respective first and second planetary gear systems;
   characterized in that
      the automatic gear-shift drive mechanism spins the drying assembly through an output shaft that rotates about an output axis;
      the first and second planetary gear systems have respective first and second gear rings and first and second planetary gears, and said first and second gear rings rotate about the output axis, the first and second clamp rings being arranged to close the first and second gear rings to stop rotation of the respective first and second gear rings;
      at any time, the lever is arranged to move to a first direction to allow the first clamp ring to stop the rotation of the first gear ring while allowing the rotation of the second gear ring, or the lever is arranged to move to a second direction opposite to the first direction to allow the second clamp ring to stop the rotation of the second gear ring while allowing the rotation of the first gear ring, such that only one of the first gear ring and the second gear ring is allowed to rotate about the output axis;
      when the automatic gear-shift drive mechanism is started being driven, the automatic gear-shift drive mechanism is biased to spin the drying assembly with the first gear system when the automatic gear-shift drive mechanism is driven and the workload is below a threshold, and switch to spin the drying assembly with the coupled first and second gear system when the automatic gear-shift drive mechanism is driven and the workload is at or above the threshold, the switching of the spinning of the automatic gear-shift drive mechanism being actuated with the movement of the lever to the first direction when the workload is below the threshold and the second direction when the workload is at or above the threshold;
      when the automatic gear-shift drive mechanism spins the drying assembly with the first planetary gear system, the first planetary gear system drives the output shaft and the output shaft drives the second planetary gear system; and
      when the automatic gear-shift drive mechanism spins the drying assembly with the coupled first and second planetary gear systems, the first planetary gear system drives the second planetary gear, and second planetary gear drives the output shaft.

2. The food-drying device of claim 1, characterized in that when the automatic gear-shift drive mechanism is started being driven and the workload is below the threshold, the lever is biased to the first direction to allow the first clamp ring to clamp the first gear ring to stop rotating while allowing the second gear ring to rotate; and
   when the automatic gear-shift drive mechanism is started being driven and the workload is at or above the threshold, the lever switches to bias to the second direction to allow the second clamp ring to clamp the second gear ring to stop rotating while allowing the first gear ring to rotate.

3. The food-drying device of claim 2, characterized in that the automatic gear-shift drive mechanism includes a coupling device that drives the output shaft, and
   when the automatic gear-shift drive mechanism is started being driven and the workload is below the threshold, the coupling device biases the lever to the first direction to allow the first clamp ring to clamp the first gear ring to stop rotating while allowing the second gear ring to rotate; and
   when the automatic gear-shift drive mechanism is started being driven and the workload is at or above the threshold, the coupling device actuates the lever to the second direction to allow the second clamp ring to clamp the second gear ring to stop rotating while allowing the first gear ring to rotate.

4. The food-drying device of claim 3, characterized in that the coupling device includes
a coupling plate engaging the lever;
a biasing member for biasing the coupling plate to a first position along a biasing axis, such that the lever causes the first gear ring to stop rotating while allowing the second gear ring to rotate; and
a coupling disk for moving the coupling plate against the biasing member to a second position such that lever causes the second gear ring to stop rotating while allowing the first gear ring to rotate
wherein the coupling plate and the coupling disk are arranged coaxially with the biasing member, the coupling plate and the coupling disk having matching tilted surfaces engaging each other, said tilted surfaces are at an angle with respect to the biasing axis.

5. The food-drying device of claim 1, characterized in that the first and second clamp rings encompass the first and second gear rings for clamping the respective first and second gear rings, said first clamp ring being capable of clamping the first gear ring to stop the first gear ring from rotating when the automatic gear-shift drive mechanism is driven and the workload is below the threshold, and said second clamp ring being capable of clamping the second gear ring to stop the second gear ring from rotating when the automatic gear-shift drive mechanism is driven and the workload is at or above the threshold.

6. The food-drying device of claim 5, characterized in that
the first and second clamp rings are expandable such that when the first clamp ring or the second claim ring expands, the respective first gear ring or the second gear ring is not clamped; and
the automatic gear-shift drive mechanism has a lever that is biased to the first direction to expand the second clamp ring when the automatic gear-shift drive mechanism is started being driven and the workload is below the threshold, and the spinning of the automatic gear-shift drive mechanism switches to expand the first clamp ring with the lever that is biased to the second direction to expand the first clamp ring when the automatic gear-shift drive mechanism is started being driven and the workload is at or above the threshold.

7. The food-drying device of claim 6, characterized in that the automatic gear-shift drive mechanism includes a coupling device that drives the output shaft, and
when the automatic gear-shift drive mechanism is started being driven and the workload is below the threshold, the coupling device biases the lever to the first direction to allow the first clamp ring to clamp the first gear ring to stop rotating while allowing the second gear ring to rotate; and
when the automatic gear-shift drive mechanism is started being driven and the workload is at or above the threshold, the coupling device actuates the lever to the second direction to allow the second clamp ring to clamp the second gear ring to stop rotating while allowing the first gear ring to rotate.

8. The food-drying device of claim 7, characterized in that the coupling device includes
a coupling plate engaging the lever;
a biasing member for biasing the coupling plate to a first position along a biasing axis, such that the lever causes the first gear ring to stop rotating while allowing the second gear ring to rotate in the first position; and
a coupling disk for moving the coupling plate against the biasing member to a second position such that lever causes the second gear ring to stop rotating while allowing the first gear ring to rotate
wherein the coupling plate and the coupling disk are arranged along the biasing axis, the coupling plate and the coupling disk having matching tilted surfaces engaging each other, said tilted surfaces are at an angle with respect to the biasing axis.

9. The food-drying device of claim 1 being driven by hand.

10. An automatic gear-shift drive mechanism for driving a device including:
a lever,
first and second clamp rings,
a first gear system having a first amplification speed, and
a second gear system that can couple with the first gear system to form a coupled first and second gear system having a second amplification speed wherein
the first amplification speed is higher than the second amplification speed;
the device carries a workload;
characterized in that
the first gear system and the second gear systems are respective first and second planetary gear systems;
the automatic gear-shift drive mechanism provides the output for the device through an output shaft that rotates about an output axis;
the first and second planetary gear systems have respective first and second gear rings and first and second planetary gears, and said first and second gear rings rotate about the output axis, the first and second clamp rings being arranged to close the first and second gear rings to stop rotation of the respective first and second gear rings;
at any time, the lever is arranged to move to a first direction to allow the first clamp ring to stop the rotation of the first gear ring while allowing the rotation of the second gear ring, or the lever is arranged to move to a second direction opposite to the first direction to allow the second clamp ring to stop the rotation of the second gear ring while allowing the rotation of the first gear ring, such that only one of the first gear ring and the second gear ring is allowed to rotate about the output axis;
when the automatic gear-shift drive mechanism is started being driven, the automatic gear-shift drive mechanism is biased to provide an output for the device with the first gear system when the automatic gear-shift drive mechanism is driven and the workload is below a threshold, and switch to provide the output for the device with the coupled first and second gear system when the automatic gear-shift drive mechanism is driven and the workload is at or above the threshold, the switching of the spinning of the automatic gear-shift drive mechanism being actuated with the movement of the lever to the first direction when the workload is below the threshold and the second direction when the workload is at or above the threshold;
when the automatic gear-shift drive mechanism provides the output with the first planetary gear system, the first planetary gear system drives the output shaft and the output shaft drives the second planetary gear system; and
when the automatic gear-shift drive mechanism provides the output with the coupled first and second planetary gear systems, the first planetary gear system drives the second planetary gears, and second planetary gears drive the output shaft.

11. The automatic gear-shift drive mechanism of claim 10, characterized in that
when the automatic gear-shift drive mechanism is started being driven and the workload is below the threshold, the lever is biased to the first direction to allow the first clamp ring to clamp the first gear ring to stop rotating while allowing the second gear ring to rotate; and
when the automatic gear-shift drive mechanism is started being driven and the workload is at or above the threshold, the lever switches to bias to the second direction to allow the second clamp ring to clamp the second gear ring to stop rotating while allowing the first gear ring to rotate.

12. The automatic gear-shift drive mechanism of claim 11, characterized in that the automatic gear-shift drive mechanism further includes a coupling device that drives the output shaft, and
when the automatic gear-shift drive mechanism is started being driven and the workload is below the threshold, the coupling device biases the lever to the first direction to allow the first clamp ring to clamp the first gear ring to stop rotating while allowing the second gear ring to rotate; and
when the automatic gear-shift drive mechanism is started being driven and the workload is at or above the threshold, the coupling device actuates the lever to the second direction to allow the second clamp ring to clamp the second gear ring to stop rotating while allowing the first gear ring to rotate.

13. The automatic gear-shift drive mechanism of claim 10, characterized in that the first and second clamp rings encompass the first and second gear rings for clamping the respective first and second gear rings, said first clamp ring being capable of clamping the first gear ring to stop the first gear ring from rotating when the automatic gear-shift drive mechanism is started being driven and the workload is below the threshold, and said second clamp ring being capable of clamping the second gear ring to stop the second gear ring from rotating when the automatic gear-shift drive mechanism is started being driven and the workload is at or above the threshold.

14. The automatic gear-shift drive mechanism of claim 13, characterized in that
the first and second clamp rings are expandable such that when the first clamp ring or the second claim ring expands, the respective first gear ring or the second gear ring is not clamped; and
the automatic gear-shift drive mechanism has a lever that is biased to the first direction to expand the second clamp ring when the automatic gear-shift drive mechanism is started being driven and the workload is below the threshold, and the spinning of the automatic gear-shift drive mechanism switches to expand the first clamp ring with the lever that is biased to the second direction to expand the first clamp ring when the automatic gear-shift drive mechanism is started being driven and the workload is at or above the threshold.

15. The automatic gear-shift drive mechanism of claim 14, characterized in that the automatic gear-shift drive mechanism further includes a coupling device that drives the output shaft, and
when the automatic gear-shift drive mechanism is started being driven and the workload is below the threshold, the coupling device biases the lever to the first direction to allow the first clamp ring to clamp the first gear ring to stop rotating while allowing the second gear ring to rotate; and
when the automatic gear-shift drive mechanism is started being driven and the workload is at or above the threshold, the coupling device actuates the lever to the second direction to allow the second clamp ring to clamp the second gear ring to stop rotating while allowing the first gear ring to rotate.

16. The automatic gear-shift drive mechanism of claim 15, characterized in that the coupling device includes
a coupling plate engaging the lever;
a biasing member for biasing the coupling plate to a first position along a biasing axis, such that the lever causes the first gear ring to stop rotating while allowing the second gear ring to rotate; and
a coupling disk for moving the coupling plate against the biasing member to a second position such that lever causes the second gear ring to stop rotating while allowing the first gear ring to rotate
wherein the coupling plate and the coupling disk are arranged along the biasing axis, the coupling plate and the coupling disk having matching tilted surfaces engaging each other, said tilted surfaces are at an angle with respect to the biasing axis.

* * * * *